July 18, 1961 H. G. DE FRANCE 2,993,086

COLOR TELEVISION SYSTEM

Filed May 22, 1957 2 Sheets-Sheet 1

INVENTOR:
HENRI GEORGES DE FRANCE
By A. John Michel
ATTORNEY

July 18, 1961 H. G. DE FRANCE 2,993,086

COLOR TELEVISION SYSTEM

Filed May 22, 1957 2 Sheets-Sheet 2

INVENTOR:
HENRI GEORGES DE FRANCE
BY A. John Michel
ATTORNEY

United States Patent Office 2,993,086

Patented July 18, 1961

2,993,086

COLOR TELEVISION SYSTEM

Henri Georges de France, 6 Ave. du Dr. Brouardel, Paris 7, France

Filed May 22, 1957, Ser. No. 660,957
Claims priority, application France May 25, 1956
18 Claims. (Cl. 178—5.2)

The invention relates to new and improved systems for transmitting and receiving television, telecinema or like images in natural colors and it has for a main object the transmission and reproduction of a high quality color television picture within the same technical standards which have been established for the transmission and reproduction of black and white or monochrome pictures, together with the possibility of obtaining black and white picture of the same quality as the picture obtained in standard black and white transmission on a black and white standard television receiver fed with the signals from the television color transmitter. The system according to the invention may be used whatever the black and white transmission standards are.

As well known, trichrome color picture rendition requires for the three primary signals simultaneously or for three distinct signals corresponding to linear combination of such primaries. In a known compatible color television sytsem (N.T.S.C.), three signals are simultaneously transmitted, a first luminance signal corresponding to the three primaries and two chrominance signals also constituted of combinations of primaries.

The luminance signal, as defined in the N.T.S.C. standards, is approximately the video signal used in black and white transmission.

The chrominance signals are rather complicated combinations of the primaries. At the receiving end, it is necessary to rebuild the three primaries separately. In order to obtain a compatible transmission, it is necessary that the luminance information should occupy the normal channel bandwidth almost completely. The chrominance informations is then to be transmitted within the same frequency band in a way such as to prevent crosstalk with the luminance signal. According to N.T.S.C. standards, the chrominance signals are transmitted through phase and amplitude modulation of a sub-carrier, the frequency of which lies inside the transmission channel. Other systems have been proposed in which the chrominance signals are coded before transmission in order to meet the bandwidth and crosstalk requirements. This leads to the design of television receivers incorporating special circuits in order to separate the chrominance signals.

In a television system according to the invention, the color receivers do not require for any special high stability circuit.

According to the invention, a compatible color television system comprises means for transmitting simultaneously the television signal used in standard black and white transmission, together with the low frequencies of one out of two different color signals which are transmitted alternately, at line frequency or a multiple thereof, and means for receiving the transmitted signals comprising storage devices which store up the sequentially transmitted color signals so as to deliver each color signal during the time period when it is not transmitted in order to feed matrix circuits which deliver continuously the three primary signals to the color picture unit.

The sequentially transmitted low frequencies of the two color signals amplitude modulate a sub-carrier in order to occupy the upper end of the transmission channel. Amplitude modulation of the sub-carrier may be either double band modulation or preferably vestigial side-band or single side-band transmission.

Identification of the color signal which is actually transmitted may be obtained by using color control signals of the kind described in U.S. application Serial No. 445,355, filed in July 23, 1954, now Patent No. 2,938,945, for: "Color Television System." This color identification is obtained by means of line sync. signals modulating the sub-carrier each time a given signal is transmitted.

As was mentioned, the system is fully compatible. Indeed, the channel bandwidth necessary to the color transmission is the same as the frequency bandwidth necessary for a black and white transmission within the same technical standards. The color sub-carrier is selected so as to prevent from interference with the black and white signal by suitable selection of its frequency with respect to the line scanning frequency as described in "Frequency Interlaced Color Television" by R. B. Dome from Electronics, September 1950, page 10.

Phase inversion of the color video signal modulating the sub-carrier helps also to reduce any pattern effect.

The frequency band necessary to the transmission of the lows of the color signals is a very small fraction of the complete channel bandwidth. Indeed, about 10% of the total bandwidth is sufficient for the lows of the color signals.

In a simplified system according to the invention the black and white signal occupies channel bandwidth less the frequency band necessary to the transmission of the color signals low frequencies. Even in this case, reduction of the horizontal definition is not noticeable. Indeed for the two sequentially transmitted color signals, the high frequency part of the information is that transmitted with the black and white signal. As primary color signals used in the color picture unit are obtained from the black and white signal and the two color signals lows (one information actually transmitted and the other previously transmitted and delivered by the delay line in the receiver), the definition is the same. Vertical definition on the color picture is the same as standard black and white vertical definition. On the two sequential color signals, there is a duplication of the low frequency components but the high frequency components from the black and white signal provide for the same definition as in standard black and white transmission. The range of the color television transmitter of a given power is very nearly the same as the range of the black and white transmitter of the same power. Transmission of the sequential color signals requires a maximum power inferior to 10% of the maximum peak black and white transmitter power. In the same way, the picture displayed on a standard black and white receiver fed with the signals from the color transmitter is equivalent to the picture displayed from the signal of a black and white transmitter.

The invention will be fully understood by reference to the following description and drawings which concern particular embodiment of the invention given without any limitation of its scope.

Figure 1:
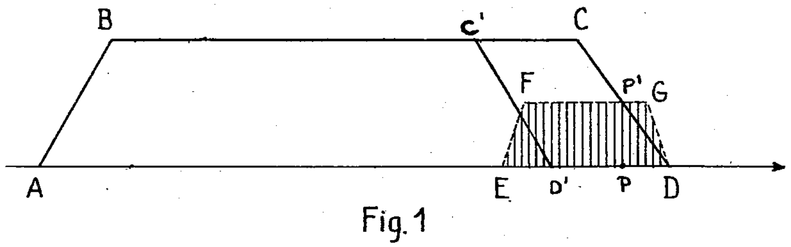
FIGURE 1 shows the signal within the transmission channel.

FIGURE 1 shows at A, B, C, D the frequency channel provided for a television transmission within the technical standard considered. Slope of line C—D at the upper end of the channel is often equal to 6 db per octave. P represents the frequency corresponding to an amplitude inferior to 6 db with respect to the maximum amplitude shown at B—C.

The frequency of the picture carrier being taken as origin, P defines the frequency of the sub-carrier which is sequentially modulated by the auxiliary color signals. A, B, C, D represent the frequency channel occupied by the black and white information in the color system according to the invention. The color auxiliary information occupies the frequency band E, F, G, D through vestigial side-band modulation of a sub-carrier at frequency P. These color signals correspond alternately to two different color informations. These color informations may be chrominance components I and Q as defined according to N.T.S.C. color television standards. They preferably correspond to monochrome signals such as red and blue monochromes. As is well known, bandwidth E—D is inferior to 1 mc., about .7 mcs. in a given embodiment of the invention. The choice of the frequency P of the sub-carrier is to be made according to known principles in order to reduce any possible cross-talk between the black and white signal transmitted in channel A, B, C, D and the auxiliary color signals transmitted in E, F, G, D. In another embodiment of the invention, the black and white signal occupies only the frequency band A, B, C', D' which has no overlapping part with frequency band E, F, G, D occupied by the color signal. The color signal changes each line, whether a monochrome or a combination of monochromes.

The energy necessary to transmit the auxiliary picture signal as appears on FIGURE 1 is only a fraction inferior to 10% of the total transmitted energy. The maximum level of the sub-carrier is set at a value inferior to —6 db with respect to the maximum level of a black and white picture signal. It is possible to compensate for this level difference between the main (black and white) and auxiliary (color) signals by setting the gain of the color channels of the receiver at the correct value in the factory so that subtraction of the monochrome signals may be performed correctly.

Figure 2A:
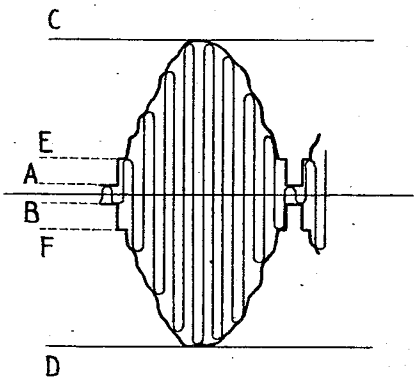
FIGURES 2A and 2B show the video signal.
Figure 2B:
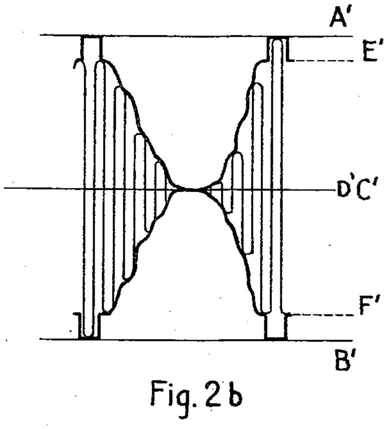

FIGURES 2A and 2B show respectively a positive and a negative type of amplitude modulation of a carrier wave by a television signal.

In FIGURE 2A, level C corresponds to maximum white or video signal level. Level E corresponds to black or minimum video signal level. Level A corresponds to sync. pulse signals. In FIGURE 2B, level A' corresponds to sync. pulse, level E' to black or minimum video signal level and C'—D' to maximum video level. When using positive modulation, the level of the carrier wave is never zero. When using negative modulation, carrier wave level is zero when the amplitude of the signal reaches its maximum value. It is therefore preferred to modulate sub-carrier P according to negative modulation irrespective of the type of modulation of the main carrier by the complete color signal.

It is necessary to provide means of identification of the color signals owing to the fact that two different auxiliary color signals are sequentially transmitted. These color identification signals may be constituted by line sync. pulses modulating the sub-carrier wave each time a given auxiliary signal is transmitted, that is one line out of two. Other kind of color identification signals may be used which modulate directly the main carrier wave such as a second line sync. signal or a larger line sync. signal than usual. Different means for color identification have been described in U.S. application Serial No. 445,355, filed in July 23, 1954, now Patent No. 2,938,945, for: "Color Television System."

Figure 3:
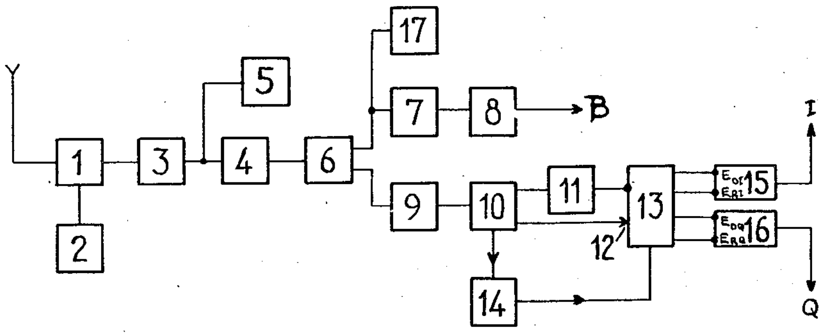
FIGURES 3, 4 and 5 are block diagrams of color television receivers designed to operate according to the system of the invention.

FIGURE 3 is a block diagram of a color television receiver designed according to the color system of the invention. It is connected to an antenna which feeds the high frequency amplifier 1 which operates also as a frequency changer by mixing the incoming signal with the local oscillator 2 signal. The intermediate frequency signal is amplified in intermediate frequency amplifier 3. The sound signal is separated at 5 and further processed as is well known in order to feed a loud speaker. The video signal is detected by the video detector 4 which delivers the video signal such as shown at FIGURE 1. The whole signal is amplified in video amplifier 6. The sync. signals are separated and amplified at 17 in order to feed the scanning assembly of the cathode ray tube or cathode ray tubes. In the simplified system, the black and white signal occupies the frequency band A, B, C', D' of the video channel. Pass-band filter 7 has a transmission characteristic matched to frequency band A, B, C', D'. The output signal from the second amplifier stage 8 is constituted of the black and white information. In parallel with filter 7, the first video amplifier 6 feeds stage 9 which is tuned at the sub-carrier frequency P and has a bandwidth corresponding to E, F, G, D. The output signal from the tuned circuit 9 is constituted by the auxiliary color signal which is detected and amplified at 10. Stage 10 feeds a delay line 11 which is designed in order to provide a delay equal to the duration of one line of the television signal. The output from delay line is fed to the electronic switch 13. Stage 10 is also directly connected to electronic switch 13. This switch is designed so as to have two inputs and four outputs which are respectively labelled $E_{DI}$, $E_{RI}$, $E_{DQ}$, $E_{RQ}$. Subscript I and Q refer to the two color informations, subscript D means that the information has been delayed through delay line 11 and subscript R means that the information has been directly transmitted from stage 10 to the electronic switch. Electronic switch 13 is controlled by means of color identification circuit 14 which selects the color identification signals from the color signals delivered by detector 10. As was stated above, these color identification signals are made of line sync. pulses modulating the sub-carrier wave each time a given color signal is transmitted. During the time when the incoming television signal incorporates color signal I the output signal from stage 10 is directly transmitted through switch 13 at output $E_{RI}$ and to amplifier 15 and the delayed Q information delivered by delay line 11 appears at output $E_{DQ}$ of switch 13 and is amplified in amplifier 16. As will be readily understood, three signals are simultaneously delivered by the already described circuits of the receiver, that is to say the black and white information B at the output of amplifier 8 and the two auxiliary color signals I and Q at the output respectively of amplifier 15 and amplifier 16. These three informations are processed by addition and subtraction in order to provide for the three monochrome signals necessary to feed the cathode ray tube(s). This processing is well known in the art and has been fully described in the technical literature such as for instance: "Methods of Matricing in an N.T.S.C. Color Television Receiver" by W. M. Quinn, Jr., I.R.E. Convention Record 1953, part. 4—page 167.

Figure 4:
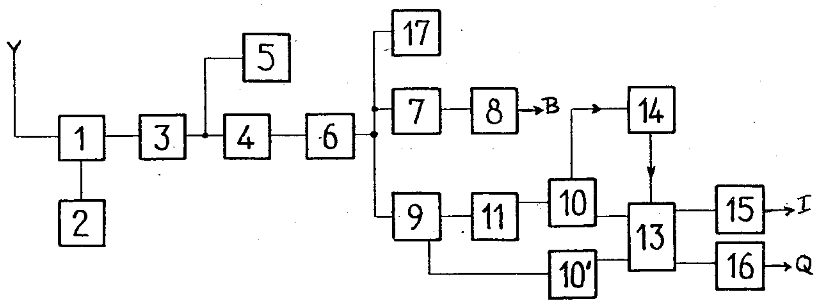

FIGURE 4 shows a block diagram of a slightly different receiver in which delay line 11 is connected directly at the output of tuned circuit 9 that is to say delay line 11 operates at the frequency of sub-carrier P instead of at video frequency. Detection of the color signals is performed respectively by detector 10 for the delayed signal and detector 10' for the direct signal. The two video signals are applied to electronic switch 13 controlled by the color identifier stage 14.

Figure 5:
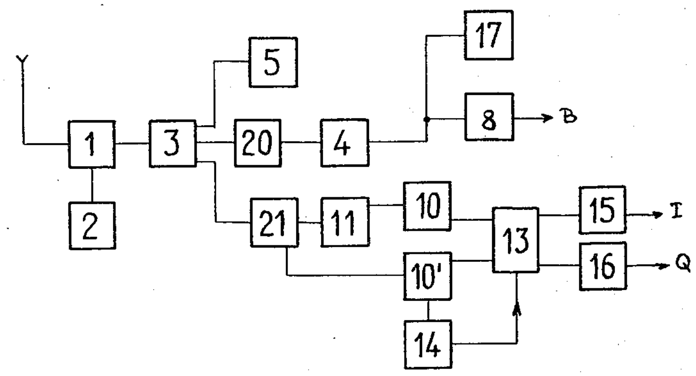

FIGURE 5 represents the block diagram of a color receiver in which delay line 11 operates at intermediate frequency. As seen on the diagram, the intermediate frequency complete color television signal delivered by the intermediate frequency amplifier 3 is fed simultaneously to the sound channel 5 and to two intermediate frequency filters respectively 20 and 21. Stage 20 is a pass-band filter the bandwidth of which corresponds to the frequency band A, B, C', D' at the intermediate frequency. The output from filter 20 corresponds to the black and white information alone which is detected in video detector 4 and delivered at the output of video amplifier 8. Filter 21 is a tuned circuit operating at the frequency equal to the intermediate frequency plus the frequency of the sub-carrier P, the band-pass of which corresponds to E, F, G, D. Filter 21 transmits only the part of the television signal corresponding to the auxiliary color informations. The output from filter 21 is fed directly to video detector 10′ and to video detector 10 through delay line 11. The output from stages 10 and 10′ are applied to electronic switch 13 controlled by the color identification signals selected at 14.

When the color signals are constituted of the low frequencies of two of the monochromes (e.g. red and blue) further processing at the outputs of amplifiers 8, 15 and 16 is reduced to an addition of output signals from 15 and 16 followed by a subtraction of the added signal from the output signal of amplifier 8 which provides for the green signal.

The high frequency components of output signal of amplifier 8 are added to the monochrome signals available at 15 and 16 before being fed to the red and blue cathode ray tube(s).

What I claim is:

1. A compatible color television system, comprising means for transmitting simultaneously a black and white signal and one out of two sequentially transmitted auxiliary color signals in the same television channel, means for receiving said signals, comprising means for storing up said sequentially transmitted auxiliary color signal for a time period equal to the transmission period of said one signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the storage means to said circuit means, and means for feeding the three different primary signals from the circuit means to a color picture unit.

2. A compatible color television system, comprising means for transmitting simultaneously a black and white signal and one out of two sequentially transmitted auxiliary color signals in the same television channel comprising first means to amplitude modulate a video frequency subcarrier with said auxiliary color signal and second means to amplitude modulate a main carrier with said black and white signal and said amplitude modulated subcarrier, means for receiving said signals comprising means for storing up said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the storage means to said circuit means, and means for feeding the three different primary signals from the circuit means to a color picture unit.

3. A compatible color television system, comprising means for transmitting simultaneously a black and white signal and one out of two sequentially transmitted auxiliary color signals in the same television channel, means for receiving said signals comprising a delay line for storing up said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the storage means to said circuit means, and means for feeding the three different primary signals from the circuit means to a color picture unit.

4. A compatible color television system, comprising means for transmitting simultaneously a black and white signal and one out of two sequentially transmitted auxiliary color signals in the same television channel, means for receiving said signals comprising an one line duration delay line for delaying said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line, to said circuit means, and means for feeding three different primary signals from the circuit means to a color picture unit.

5. A compatible color television system comprising means for transmitting simultaneously a black and white signal and one out of two sequentially transmitted auxiliary color signals in the same television channel, means for receiving said signals comprising a delay line operating at video frequency for storing up said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line to said circuit means, and means for feeding the three different primary signals from the circuit means to a color picture unit.

6. A compatible color television system, comprising means for transmitting simultaneously a black and white signal and one out of two sequentially transmitted auxiliary color signals in the same television channel, means for receiving said signals comprising a delay line operating at the sub-carrier frequency for storing up said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line to said circuit means, and means for feeding the three different primary signals from the circuit means to a color picture unit.

7. A compatible color television system, comprising means for transmitting simultaneously a black and white signal and one out of two sequentially transmitted auxiliary color signals in the same television channel, means for receiving said signals comprising a delay line operating at intermediate frequency for storing up said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line to said circuit means, and means for feeding the three different primary signals from the circuit means to a color picture unit.

8. A color television system comprising means for transmitting simultaneously a first video signal and one of two sequentially transmitted additional video signals, means for receiving said signals comprising means for storing said one sequentially transmitted signal, for a time period equal to the transmission period of said signal, a matrixing network, means for feeding said first video signal, the presently transmitted additional video signal, and the previously transmitted additional video signal from said storing means to said network and means for feeding the output signals of said network to a color picture unit.

9. A color television system comprising means for transmitting simultaneously a first video signal and one of two sequentially transmitted additional video signals, means for receiving said signals comprising means for storing said one sequentially transmitted signal for a time period equal to the transmission period of said signal, means for deriving three different primary signals from said first video signal, the presently transmitted additional video signal and the previously transmitted additional video signal from the storing means and means for feeding said three different primary signals to a color picture unit.

10. A color television receiver comprising means for receiving simultaneously a black and white signal and one out of two sequentially transmitted auxiliary color signals, means for storing said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from said storing means to said circuit means, and means for feeding hte three differernt primary signals from the circuit means to a color picture unit.

11. A color television receiver comprising means for receiving simultaneously a black and white signal and one out of two sequentially transmitted auxiliary color signals; a delay line for storing said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from said storing means to said circuit means, and means for feeding the three different primary signals from said circuit means to a color picture unit.

12. A color television receiver comprising means for receiving simultaneously a black and white signal and one out of two sequentially transmitted auxiliary color signals, a one line duration delay line for delaying said one sequentially transmitted auxiliary color signals for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from said delay line to said circuit means, and means for feeding the three different primary signals from said circuit means to a color picture unit.

13. A color television receiver comprising means for receiving simultaneously a black and white signal, and one out of two sequentially transmitted auxiliary color signals in the same television channel, a delay line operating at video frequency for storing said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from said delay line to said circuit means and means for feeding the three different primary signals from said circuit means to a color picture unit.

14. A color television receiver comprising means for receiving simultaneously a black and white signal, and one out of two sequentially transmitted auxiliary color signals in the same television channel, a delay line operating at the sub-carrier frequency for storing said one sequentially transmitted auxiliary color signal for a time period equal to the transmission period of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line to said circuit means, means for feeding the three different primary signals from said circuit to a color picture unit.

15. A color television receiver comprising means for receiving simultaneously a black and white signal and one out of two sequentially transmitted auxiliary color signals in the same television channel, a delay line operating at intermediate frequency for storing said one sequentially transmitted auxiliary color signal for a time period equal to the transmission of said signal, circuit means for deriving three different primary color signals from said black and white signal, the presently transmitted color signal and the previously transmitted color signal from the storing means, said circuit means comprising a matrix for deriving at least one of said primary signals, means for feeding separately the black and white signal, the presently transmitted color signal and the previously transmitted color signal from the delay line to said circuit means, means for feeding the three different primary signals from the circuit means to a color picture unit.

16. A color television receiver comprising means for receiving simultaneously a first video signal and one of two sequentially transmitted additional video signals, means for storing said one sequentially transmitted additional video signal for time period equal to the transmission period of said signal, a matrix network, means for feeding separately said first video signal, the presently transmitted additional video signal and the previously transmitted additional video signal from said storing means to said matrix network and means for applying the output signals from said matrix network to a color picture unit.

17. A color television receiver comprising means for receiving simultaneously a first video signal and one of two sequentially transmitted additional video signals, means for storing said one sequentially transmitted additional video signal for time period equal to the transmission period of said signal, means for deriving three different primary signals from said first video signal, the presently transmitted additional video signal and the previously transmitted additional video signal from the storing means and means for feeding said different primary signals to a color picture unit.

18. A compatible color television transmitter comprising means for sequentially modulating a subcarrier with two narrow-band color signals and means for modulating a carrier with a continuously transmitted wide-band black and white signal occupying at least the lower and major part of the transmission channel allowed for picture signals and with said modulated subcarrier.

References Cited in the file of this patent

UNITED STATES PATENTS

| | | |
|---|---|---|
| 2,657,255 | Wintringham | Oct. 27, 1953 |
| 2,729,697 | Chatten | Jan. 3, 1956 |
| 2,804,496 | Kirkwood | Aug. 27, 1957 |
| 2,810,779 | Luck | Oct. 22, 1957 |
| 2,811,578 | Rieke | Oct. 29, 1957 |
| 2,825,753 | Hausz | Mar. 4, 1958 |

FOREIGN PATENTS

| | | |
|---|---|---|
| 812,987 | France | May 21, 1937 |